(12) United States Patent
Savrun et al.

(10) Patent No.: US 9,855,548 B2
(45) Date of Patent: Jan. 2, 2018

(54) HIGH TEMPERATURE CATALYSTS FOR DECOMPOSITION OF LIQUID MONOPROPELLANTS AND METHODS FOR PRODUCING THE SAME

(71) Applicant: Sienna Technologies, Inc., Woodinville, WA (US)

(72) Inventors: Ender Savrun, Seattle, WA (US); Stephanie J. Sawhill, Bothell, WA (US)

(73) Assignee: Sienna Technologies, Inc., Seattle, WA (US)

( * ) Notice: Subject to any disclaimer, the term of this patent is extended or adjusted under 35 U.S.C. 154(b) by 206 days.

(21) Appl. No.: 14/309,044

(22) Filed: Jun. 19, 2014

(65) Prior Publication Data

US 2014/0329664 A1 Nov. 6, 2014

Related U.S. Application Data

(63) Continuation-in-part of application No. 12/942,364, filed on Nov. 9, 2010, now abandoned.

(51) Int. Cl.
 B01J 21/06 (2006.01)
 B01J 23/46 (2006.01)
 (Continued)

(52) U.S. Cl.
 CPC ........... B01J 23/468 (2013.01); B01J 23/007 (2013.01); B01J 23/36 (2013.01); B01J 23/42 (2013.01);
 (Continued)

(58) Field of Classification Search
 CPC ... B01J 21/06; B01J 23/46; F02K 9/70; F02K 9/80
 See application file for complete search history.

(56) References Cited

U.S. PATENT DOCUMENTS 3,298,182 A 1/1967 Webb
5,780,157 A 7/1998 Tuffias et al.
(Continued)

FOREIGN PATENT DOCUMENTS

WO 2008087147 7/2008
WO 2011121571 10/2011

OTHER PUBLICATIONS

Aoki, JP02129031, May 17, 1990, Production of Alumina coated ceramic powder, abstract.*
(Continued)

*Primary Examiner* — Aileen B Felton
(74) *Attorney, Agent, or Firm* — Lowe Graham Jones PLLC

(57) ABSTRACT

Ceramic catalyst carriers that are mechanically, thermally and chemically stable in a ionic salt monopropellant decomposition environment, high temperature catalysts for decomposition of liquid high-energy-density monopropellants and ceramic processing techniques for producing spherical catalyst carrier granules are disclosed. The ceramic processing technique is used to produce spherical catalyst carrier granules with controlled porosities and desired composition and allows for reproducible packing densities of catalyst granules in thruster chambers. The ceramic catalyst carrier has excellent thermal shock resistance, good compatibility with the active metal coating and metal coating deposition processes, melting point above >2300° C., chemical resistance to steam, nitrogen oxides and nitric acid, resistance to sintering to prevent void formation, and the absence of phase transition associated with volumetric changes at temperatures up to and beyond 1800° C.

18 Claims, 8 Drawing Sheets

(51) Int. Cl.
| | |
|---|---|
| *F02K 9/70* | (2006.01) |
| *F02K 9/80* | (2006.01) |
| *B01J 23/00* | (2006.01) |
| *B01J 35/10* | (2006.01) |
| *B01J 37/02* | (2006.01) |
| *C04B 35/01* | (2006.01) |
| *B01J 23/36* | (2006.01) |
| *B01J 23/42* | (2006.01) |
| *B01J 35/00* | (2006.01) |

(52) U.S. Cl.
CPC ......... *B01J 23/462* (2013.01); *B01J 23/464* (2013.01); *B01J 23/466* (2013.01); *B01J 35/002* (2013.01); *B01J 35/1019* (2013.01); *B01J 37/0215* (2013.01); *C04B 35/01* (2013.01)

(56) References Cited

U.S. PATENT DOCUMENTS

| | | |
|---|---|---|
| 5,855,828 A | 1/1999 | Tuffias et al. |
| 5,914,294 A | 6/1999 | Park et al. |
| 7,514,055 B2 | 4/2009 | Golden |
| 2002/0058581 A1* | 5/2002 | Youngman ............ C04B 35/18 501/155 |
| 2008/0118804 A1 | 5/2008 | Tucker et al. |
| 2009/0139400 A1 | 6/2009 | Bach et al. |

OTHER PUBLICATIONS

Tejuca et al., "Structure and Reactivity of Perovskite-Type Oxides," Advance in Catalysis, vol. 36, pp. 237-328; 1989.

Rodrigues, et al., "Nitride and Carbide of Molybdenum and Tungsten as Substitutes of Iridium for the Catalysts Used for Space Communication," Catalysts Letters, 45 (1997) 1-3.

Kirchnerova et al., "Design Criteria for High-Temperature Combustion Catalysts," Catalysts Letters 67 (2000) 175-181.

Trombe et al., "Calcium Zirconate Prepared in a Solar Furnace," Bull. Soc. Franc. Ceram, (1957), No. 34, 11-8.

* cited by examiner

ZrO₂-Y₂O₃

HIGH TEMPERATURE CATALYSTS FOR DECOMPOSITION OF LIQUID MONOPROPELLANTS AND METHODS FOR PRODUCING THE SAME

PRIORITY CLAIM

This is a continuation-in-part of U.S. application Ser. No. 12/942,364, filed Nov. 9, 2010, the contents of which are hereby incorporated by reference.

GOVERNMENT SUPPORT

This invention was in part made with government support under Contract Nos. F04611-00-0030 and F04611-02-C-0006 awarded by the United States Air Force (AFRL). The Government has certain rights in the invention.

FIELD OF THE INVENTION

This invention relates generally to high temperature catalysts for decomposition of liquid high-energy-density ionic salt monopropellants and methods for producing the same.

BACKGROUND OF THE INVENTION

Reduced toxicity high-energy-density ionic salt monopropellants, including but not limited to monopropellants containing an oxidizer such as hydroxylammonium nitrate (HAN, [HO—$NH_3^+$]$NO_3^-$) and one or more fuels in highly concentrated solutions containing water, ethanol or a suitable solvent or without a solvent are being investigated as potential replacements for hydrazine-based propellants. The new monopropellants, which will hereinafter sometimes be referred to as ionic salt monopropellants or high-energy-density ionic salt monopropellants and which include HAN-based ionic salt monopropellants, offer lower toxicity, lower flammability, lower vapor pressure, lower freezing-point temperature, and higher density-specific impulse than hydrazine-based monopropellants.

Liquid monopropellants, including but not limited to HAN-based ionic salt monopropellants, can be decomposed by passing them over a solid catalyst bed. The catalyst decreases the activation energy required for monopropellant decomposition, thus allowing for combustion at lower temperatures than required for pure thermal decomposition.

The high-adiabatic-decomposition-temperatures of the described HAN-based ionic salt monopropellants render conventional catalysts ineffective when applied to these formulations. The adiabatic flame temperature of the HAN-based ionic salt monopropellants exceeds 1800° C., whereas hydrazine possesses an adiabatic flame temperature of only 900° C. In addition, decomposition of the HAN-based ionic salt monopropellants produces highly oxidizing species such as oxygen ($O_2$) and water vapor that are highly corrosive to metals as well as ceramics such as alumina ($Al_2O_3$) that are typically used in conventional catalysts.

Conventional, prior art catalysts such as Ir/$Al_2O_3$, Pt/$Al_2O_3$, LCH-210, LCH-207, LCH-227, Shell 405 or S-405 that were developed for use with hydrazine cannot withstand the higher operating temperatures and the more corrosive environment encountered in decomposing high-energy-density HAN-based ionic salt monopropellants. Problems observed during rocket engine tests containing conventional catalysts with new monopropellants include excessive sintering of catalyst, void formation, increase in pressure drop, fracturing of catalyst granules, fine formation, fragmentation of the catalyst granules due to thermal shock, leaching of the catalyst by acids, and rapid loss of catalyst activity.

Ceramic materials that have been evaluated as catalyst carriers for use with HAN-based ionic salt monopropellants include transition metal oxides such as $Al_2O_3$, $TiO_2$, $ZrO_2$, $CeO_2$—$ZrO_2$, $Y_2O_3$—$ZrO_2$ (Kirchnerova, J., Klvana, D. (2000) "Design Criteria for High Temperature Combustion Catalysts," Catalysis Lett, Vol. 67, p. 175.), refractory carbides and nitrides such as SiC and $Si_3N_4$ (Rodrigues, J. A. J et al., (1997), "Nitride and Carbide of Molybdenum and Tungsten as Substitutes of Iridium for the Catalyst Used for Space Communication", Catalysis Lett., Vol. 45, P. 1-3.), transition metal-based and alkaline earth-based perovskites (Savrun, E. and Schmidt, E. W., (2001), "High Temperature Catalyst for Nontoxic Monopropellant", Air Force Research Laboratories SBIR Phase I Final Report, AFRL-PR-ED-TR-2001-0012; Savrun, E. et al., "Novel Catalysts for HAN/HEHN Based Monopropellants", NASA Glenn Research Center SBIR Phase I final Report, NAS3-02025) and transition metal substituted lanthanum-strontium hexaaluminates (Tejuca, L. G., Fierro, J. L. G., and Tascon, J. M. D., (1989) "Structure and Reactivity of Perovskite-Type Oxides", Adv. Catalysis, Vol. 36, P. 237).

SUMMARY OF THE INVENTION

Ceramic catalyst carriers that are mechanically, thermally and chemically stable in high-energy-density ionic salt monopropellant decomposition environments, catalysts comprising the ceramic catalyst carriers and a catalytically active coating, and methods for fabricating spherical ceramic catalyst carrier granules are disclosed.

The ceramic catalyst carriers of the present invention are modified high temperature perovskite-based ceramics with high mechanical, chemical and thermal stability in the rocket engine environment and therefore are suitable for preparation of catalysts for the decomposition of ionic salt (including HAN-based) monopropellants. The ceramic catalyst carriers of the present invention have various advantages, particularly when compared to previous materials, including excellent thermal shock resistance, good compatibility with catalytically active coatings (e.g., active metal coatings) and coating deposition processes, high melting points that are well above 2000° C., chemical resistance to steam, nitrogen oxides and nitric acid, resistance to sintering to prevent void formation, and the absence of phase transitions associated with volumetric changes at temperatures up to and greater than 1800° C.

In one embodiment, the present invention provides ceramic catalyst carriers comprising an alkaline-earth perovskite having the formula ABO3, wherein A is magnesium, calcium, strontium, or barium or combinations thereof and B is zirconium or hafnium, in which excess B cations (zirconium or hafnium cations) are added to form a secondary B cation-rich phase with high corrosion resistance in acidic and steam-rich environments.

In certain embodiments, the secondary phase that is formed by the addition of excess zirconium or hafnium cations is a partially or fully stabilized zirconia or hafnia stabilized by A cations.

In another embodiment, the present invention provides ceramic catalyst carriers comprising an alkaline-earth perovskite having the formula ABO3, wherein A is calcium and B is zirconium or hafnium, in which secondary calcium-rich phases (A cation-rich) present in the perovskite have been reduced, eliminated or are otherwise not present.

In certain embodiments, the secondary phase present in the perovskite that is reduced, eliminated or otherwise not present is calcium oxide and removal of the calcium oxide is accomplished by the addition of excess zirconium or hafnium cations.

In further embodiments, excess zirconium or hafnium cations are added to perovskite to form a second phase that is also a solid solution, such as calcia (CaO)-stabilized cubic zirconia (ZrO2), which has a high resistance to chemical attack and/or is insoluble or has low solubility in strong acids.

In other embodiments, the ceramic catalyst carrier comprises a non-stoichiometric zirconate or hafnate containing excess zirconium or hafnium cations and having the formula $AZr_{1+y}O_{3+2y}$ or $AHf_{1+y}O_{3+2y}$, wherein A=Mg, Ca, Sr or Ba or combinations thereof and y is about 0.005 to about 3.0.

In another embodiment, the present invention provides methods of fabricating spherical ceramic catalyst carrier granules comprising the steps of: suspending precursor powders in a liquid to form a slurry; flash-freezing droplets of the slurry to produce frozen spherical granules; sublimating the liquid from the frozen spherical granules to produce spherical precursor granules; and sintering the spherical precursor granules to produce the spherical ceramic catalyst carrier granules.

In an additional embodiment, the present invention provides catalysts comprising the ceramic catalyst carrier as described above and an active metal coating which comprises about 0.1% to about 50% by weight, preferably 1% to about 20% by weight, of one or more metals selected from the group consisting of platinum, rhodium, ruthenium, rhenium, osmium and iridium.

In certain embodiments, the active metal coating of the catalyst is comprised of iridium, or iridium/rhodium or iridium/osmium alloys, or combinations thereof.

The ceramic catalyst carriers of the present invention are particularly useful for the preparation of catalysts for the decomposition of high-energy-density ionic salt monopropellants, including HAN-based ionic salt monopropellants, in the reaction engines of satellites and rockets. However, it should be understood that the ceramic catalyst carriers and catalysts of the present invention can be used with other propellants, including hydrazine and hydrazine derivatives and bipropellants, nitrous oxide-based monopropellants and bipropellants, and for other applications, including decomposition of nitrogen oxide compounds (e.g., $NO_x$ compounds or $N_2O$) in automotive or gas abatement applications.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
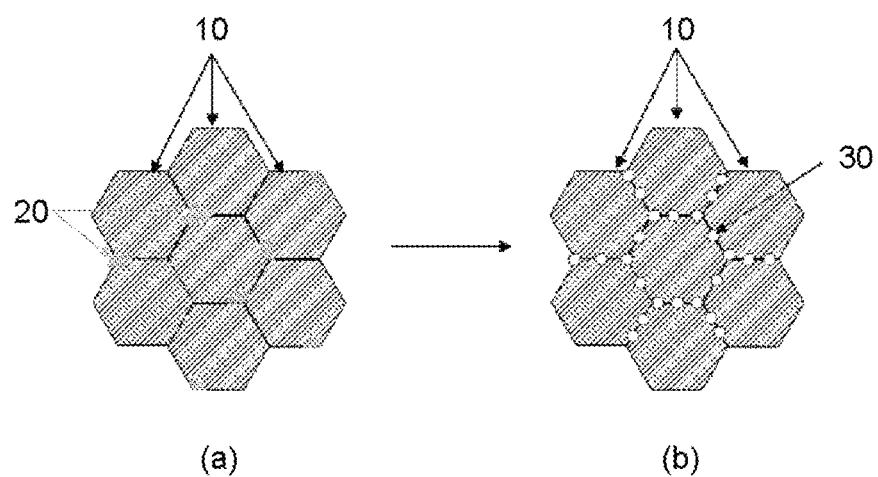
FIG. 1 is a schematic depiction of (a) stoichiometric CaZrO3 with CaO at the grain boundaries, and (b) Zr-rich CaZrO3 containing excess Zr4+ ions ($CaZr_{1+y}O_{3+2y}$) with no CaO and a calcia-stabilized cubic zirconia phase at the grain boundaries.

Perovskites are ceramic oxide materials with a general formula of ABO3, wherein A is a (2+) cation, B is a (4+) cation and O is oxygen.

The present invention is based on the finding of the inventors that certain perovskite materials in which secondary AO or A-cation-rich phases that can be degraded or leached out by strong acids or in acidic environments have been reduced, eliminated or are otherwise not present and/or secondary B-cation-rich phases that are inert to chemical attack and/or are insoluble or have low solubilities in strong acids are added to perovskite material, can be used to prepare ceramic catalyst carriers that have high mechanical, chemical and thermal stabilities in the rocket engine environment. Therefore, these ceramic catalyst carriers are suitable for the preparation of catalysts for the decomposition of ionic salt monopropellants, such as HAN-based monopropellants. As used herein, the term "secondary phase" means a phase other than the major perovskite phase, i.e., a phase that does not have a stoichiometric ABO3 formula where A/B mole ratio is equal to one. For example, in one particular embodiment of the present invention, it has been shown that an excess of B cations (Zr ions) in concentrations of >0.01 mol % Zr (y>0.01) results in formation of stabilized cubic zirconia (ZrO2) in the perovskite material, increases the acid resistance of $CaZr_{1+y}O_{3+2y}$ and dramatically improves its stability in the HAN-based ionic salt monopropellant combustion chamber environment as discussed herein.

In one embodiment, the present invention provides ceramic catalyst carriers comprising an alkaline-earth perovskite having the formula ABO3, wherein A is calcium and B is zirconium or hafnium, in which excess B cations (zirconium or hafnium cations) are added to form a secondary B cation-rich phase with high corrosion resistance in acidic and steam-rich environments.

In certain embodiments, the present invention provides ceramic catalyst carriers comprising an alkaline-earth perovskite having the formula ABO3, wherein A is calcium and B is zirconium or hafnium, in which secondary phases that can be degraded or leached out by strong acids or in acidic environments present in the perovskite have been reduced, eliminated or are otherwise not present.

In other embodiments, excess zirconium or hafnium cations are added to perovskite to form a second phase that is also a solid solution, such as calcia (CaO)-stabilized cubic zirconia (ZrO2), which has a high resistance to chemical attack and low solubility in strong acids.

In certain embodiments, elimination or formation of secondary phases as described above occurs at the grain boundaries of said perovskite material.

Various perovskite materials can be used as the base material to prepare the ceramic catalyst carriers and catalysts of the present invention. For example, CaZrO3, CaHfO3, BaZrO3, BaHfO3, SrZrO3, SrHfO3, MgZrO3 and MgHfO3 or a combination thereof can be used as the base perovskite material. CaZrO3, and CaHfO3 are particularly useful base perovskite materials for the preparation of the ceramic catalyst carriers and catalysts of the present invention for high-energy-density ionic salt monopropellants (including HAN-based monopropellants) because (i) they do not undergo destructive phase transformations at temperatures below their melting points (<2507° C. and <2587° C., respectively), (ii) they have high thermochemical stabilities in oxidizing environments, and (iii) they have low vapor pressures at temperatures above 1200° C., and thus they will not decompose or undergo phase changes in the combustion chamber environment. The foregoing thermal and chemical stabilities of CaZO3 and CaHfO3 at high temperatures in both oxidizing and reducing environments render them suitable base perovskite materials for the preparation of the ceramic catalyst carriers and catalysts of the present invention.

In order for the base perovskite material such as CaZO3 or CaHfO3 discussed above to be used to prepare the ceramic catalyst carriers and catalysts of the present invention, the base perovskite material is modified to reduce or eliminate the presence of secondary phases in the perovskite material, which would otherwise be degraded or leached out in acidic environments or propellant combustion environments, and in some cases to intentionally form a secondary phase in the perovskite material that is known to have high resistance to corrosion in acidic and steam-rich environments such as the propellant combustion environments. In certain embodiments, the base perovskite material is CaZO3 and the secondary phase that is reduced or eliminated is CaO. In other embodiments, the base perovskite material is CaHfO3 and the secondary phase that is removed or eliminated is CaO. In other embodiments the secondary phase that is intentionally formed is CaO-stabilized cubic zirconia or CaO-stabilized hafnia.

In additional embodiments the above approach can be applied to base perovskites such as MgZO3 or MgHfO3, SrZO3 or SrHfO3, and BaZO3 or BaHfO3 in which the secondary phases that are removed are MgO, SrO and BaO, respectively. In other embodiments the secondary phase that is intentionally formed in the perovskite material is MgO-stabilized ZrO2 or MgO-stabilized HfO2, SrO-stabilized ZrO2 or SrO-stabilized HfO2, and BaO-stabilized ZrO2 or BaO-stabilized HfO2, respectively.

While not intending to be bound by any particular theory, it is believed by the inventors that secondary phases that are end member oxides, such as CaO in CaZO3, or A-cation-rich phases, such as Ca-rich phases or Ca1+y ZO3+y, where 1>y>0.001, in CaZO3, present in the base perovskite material detrimentally effect the thermal and chemical stability of ceramic catalyst carriers and catalysts made from the perovskite material during the high temperature decomposition of ionic salt monopropellants. Thus, reducing or eliminating these secondary phases from the base perovskite material improves the chemical and thermal stability of the ceramic catalyst carriers and catalysts made from the perovskite material. For example, in the case of CaZO3 and CaHfO3, stoichiometric CaZO3 and CaHfO3 are susceptible to corrosion by acids and thus can breakdown during use with HAN-based ionic salt monopropellants that can form acidic species such as nitric acid (HNO3) during combustion. In addition, poor acid resistance can also cause breakdown of CaZO3 and CaHfO3 ceramic catalyst carriers during deposition of the active metal layer via wet impregnation or other wet chemical methods that employ use of an acidic metal salt solution deposition process. For example, deposition of iridium (Ir) can be carried out via wet impregnation using dihydrogen hexachloroiridic acid (H2IrCl6.6H2O) aqueous solutions that contain a high concentration of hydrogen chloride (HCl) acid. This poor acid resistance is believed by the inventors to result from the presence of CaO, or a CaO-rich phase, at the grain boundaries in stoichiometric CaZO3 (mol ratio Ca/Zr=1) and CaHfO3 (Ca/Hf=1) ceramics, which may react with H2O/steam or acids formed during the decomposition of HAN-based ionic salt monopropellants. The CaO, or CaO-rich phase present at the grain boundaries reacts with the acid and is leached out, significantly weakening the ceramic. Since CaO readily dissolves in acids, the resistance of CaZO3 and CaHfO3 to chemical attack, or attack by acids, is drastically reduced by the presence of CaO at the grain boundaries. Leaching of CaO at the grain boundaries in CaZO3 or CaHfO3 during deposition of the active metal layer via wet impregnation would drastically reduce their mechanical strengths and promote further breakdown of the resulting catalyst during use in a thruster chamber at elevated temperatures and pressures. In addition, nitric acid that forms during combustion of HAN-based ionic salt monopropellants in the thruster chamber would cause additional leaching of CaO and mechanical breakdown of the CaZO3 or CaHfO3 carrier. This is consistent with the finding by the inventors that upon exposure to acids, such as concentrated hydrochloric acid or concentrated nitric acid solutions, the mechanical strength (or crush strength) of stoichiometric CaZO3 (mol ratio Ca/Zr=1) significantly decreases.

While not intending to be bound by any particular theory, it is also believed by the inventors that secondary phases that are B-cation rich (Zr-rich or Hf-rich), such as CaO-stabilized cubic ZrO2 or MgO-stabilized ZrO2, present in the base perovskite material improve the chemical stability of ceramic catalyst carriers and catalysts made from the perovskite material during the high temperature decomposition of ionic salt monopropellants. Thus, addition of these secondary phases to the base perovskite material improves the chemical stability of the ceramic catalyst carriers and catalysts made from the perovskite material. For example, in the case of CaZO3, stoichiometric CaZO3 is susceptible to corrosion by acids (e.g., HNO3) and thus can breakdown during use with HAN-based ionic salt monopropellants. In addition, poor acid resistance can also cause breakdown of CaZO3 ceramic catalyst carriers during deposition of the active metal layer via wet impregnation or other wet chemical methods that employ use of an acidic metal salt solution (containing HCl) deposition process. Since zirconia and stabilized zirconia are more resistant to corrosion by acids such as HNO3 and HCl, the resistance of CaZO3 to chemical attack, or attack by acids, is drastically increased by the presence of zirconia and/or stabilized zirconia, e.g., CaO-stabilized cubic ZrO2, in the perovskite material.

Various methodologies can be used to reduce or eliminate undesirable secondary phases, i.e., phases with poor acid resistance, from the base perovskite materials that are used to prepare the ceramic catalyst carriers and catalysts of the present invention. For example, in the case of CaZO3, the addition of excess zirconium ions (Zr4+) in the form of zirconia (ZrO2) to stoichiometric CaZO3 to form CaZr1+yO3+2y, wherein y is about 0.005 to about 3.0 and preferably about 0.5 to about 1.5, can be used to reduce or eliminate CaO, resulting in an acid resistant material that does not suffer mechanical degradation after soaking in acids (HCl or HNO3) or exposure to hot acid steams. Without intending to be bound by any particular theory, it is believed that the presence of excess ZrO2 helps tie up any unreacted or precipitated CaO such that CaO no longer ends up at the grain boundaries or anywhere in the material. Therefore, addition of excess zirconium ions to form CaZr1+yO3+2y, wherein y is about 0.005 to about 3.0, is one method to eliminate CaO at the CaZO3 grain boundaries and form an acid resistant carrier material. In another embodiment, the excess CaO can be removed through evaporation at high temperatures (>1600° C.), preferably in vacuum. This treatment would effectively remove the excess CaO from the surface of CaZO3 leaving a ZrO2 rich CaZr1+yO3+2y on the surface. In a further embodiment, the excess CaO can be removed through acid leaching. Similarly, in the case of CaHfO3, the addition of excess hafnium ions (Hf4+) in the form of HfO2 to stoichiometric CaHfO3 to form CaHf1+yO3+2y, wherein y is about 0.005 to about 3.0, can be used to reduce or eliminate CaO, also resulting in an acid resistant material that does not suffer mechanical degradation after soaking in acids (HCl or HNO3) or exposure to hot acid steams. The excess CaO can also be removed from stoichiometric CaHfO3 through evaporation at high temperatures (>1600° C.), preferably in vacuum, or through acid leaching.

Without intending to be bound by any particular theory, it is likely that addition of excess zirconium ions (Zr4+) to stoichiometric CaZO3 to form CaZr1+yO3+2y, wherein y is about 0.005 to about 3.0, promotes formation of a zirconia-rich phase, calcia(CaO)-stabilized cubic zirconia phase (ZrO2), at the CaZO3 grain boundaries. Unreacted or precipitated CaO at the CaZO3 grain boundaries forms a solid solution with the excess zirconia to form CaO-stabilized cubic zirconia, which has a high chemical stability, such that the acid resistance of CaZr1+yO3+2y is dramatically improved.

Similarly, since CaHfO3 is isostructural with CaZO3 and has similar chemical properties, is likely that addition of excess hafnium ions (Hf4+) to stoichiometric CaHfO3 to form CaHf1+yO3+2y, wherein y is about 0.005 to about 3.0, promotes formation of a hafnia-rich phase, calcia(CaO)-stabilized hafnia phase (HfO2), at the CaHfO3 grain boundaries. Unreacted or precipitated CaO at the CaHfO3 grain boundaries forms a solid solution with the excess hafnia to form CaO-stabilized hafnia, which has a high chemical stability, such that the acid resistance of CaHf1+yO3+2y is improved.

Referring now to FIG. 1, a schematic showing the effect of adding excess Zr4+ ions in the form of ZrO2 to eliminate CaO in CaZO3 or at the CaZO3 grain boundaries and form acid resistant CaZr1+yO3+2y is shown. Panel (a) of FIG. 1 shows stoichiometric CaZO3 grains 10 with CaO 20 located at the boundaries of the CaZO3 grains 10. In contrast, panel (b) of FIG. 1 shows Zr-rich CaZO3 in which the excess Zr4+ ions have formed CaO-stabilized cubic zirconia 30 at the boundaries of the CaZO3 grains 10.

Figure 2:
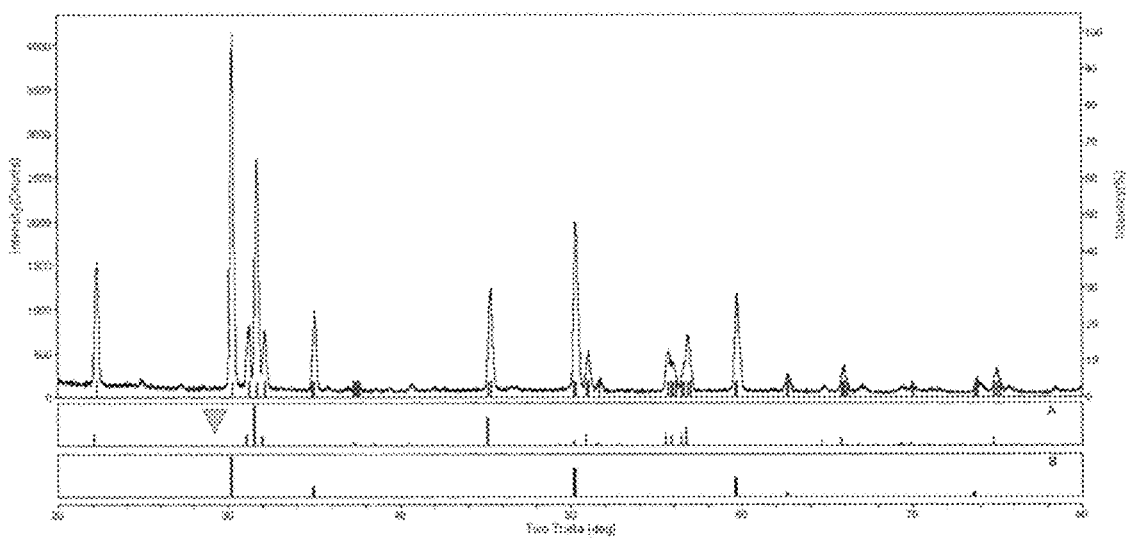
FIG. 2 is an X-ray diffraction (XRD) pattern of $CaZr_{1+y}O_{3+2y}$ containing excess Zr ions (y=0.01-1.0), in accordance with an embodiment of the present invention. Also shown is the reference pattern for CaZrO3 (PDF card no. 035-0790) labeled "A" and calcia stabilized cubic zirconia (PDF card no. 026-0341) labeled "B".

An x-ray diffraction (XRD) pattern of a prepared CaZr1+yO3+2y ceramic substrate is shown in FIG. 2. The XRD pattern indicates the presence of mostly CaZO3 (orthorhombic) and stabilized cubic zirconia. The presence of the high temperature cubic zirconia phase at ambient temperatures indicates it is fully stabilized by CaO since it is the only stabilizer in the system. Depending on the stoichiometry of CaZr1+yO3+2y, or the concentration of excess Zr ions (y), the stabilized cubic zirconia phase may or may not be detectable using XRD.

It is likely that the Zr-rich CaZO3 (CaZr1+yO3+2y) material of the present invention described here contains calcia-stabilized cubic zirconia (<10% mol) in the form of relatively small, discrete grains along the CaZO3 grain boundaries. Since the calcia-stabilized cubic zirconia particles are small and discrete, nucleation and sintering that is known to occur over time in stabilized cubic zirconia is inhibited. Thus ageing or destabilization of the cubic zirconia solid solution in the material is inhibited.

Figure 3A:
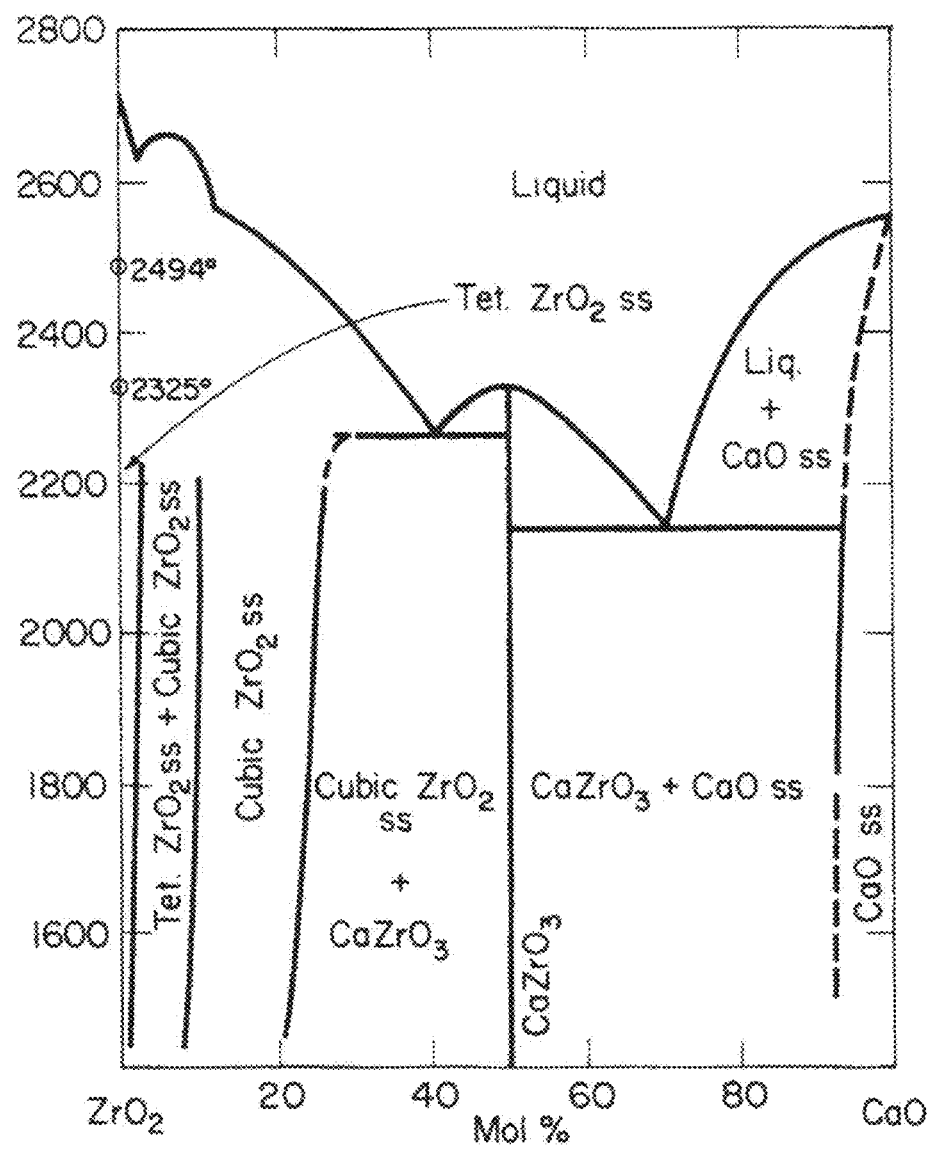
FIGS. 3A, 3B, and 3C shows phase diagrams of CaO—ZrO2, Y2O3-ZrO2, and CeO2-Y2O3 systems.
Figure 3B:
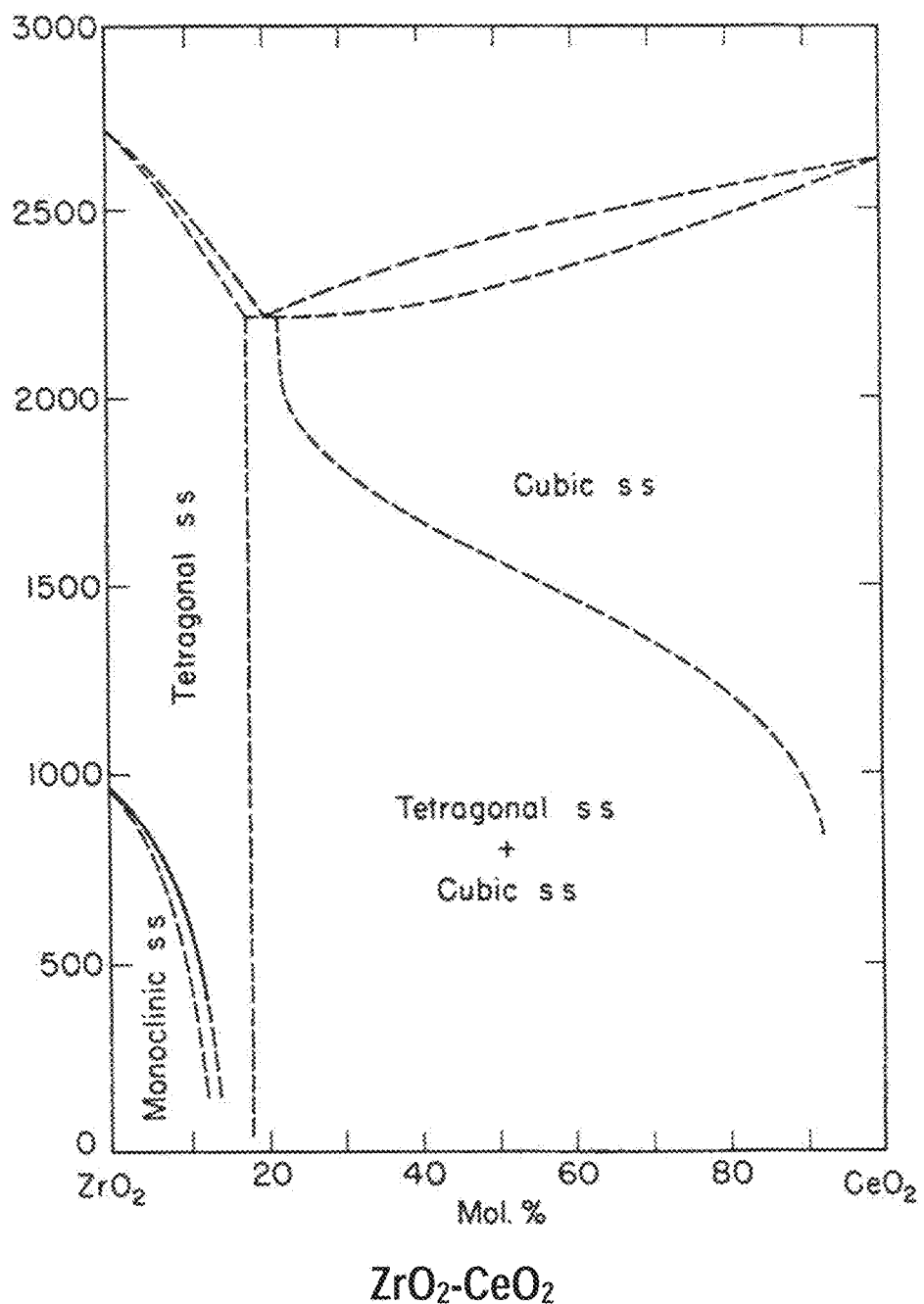
Figure 3C:
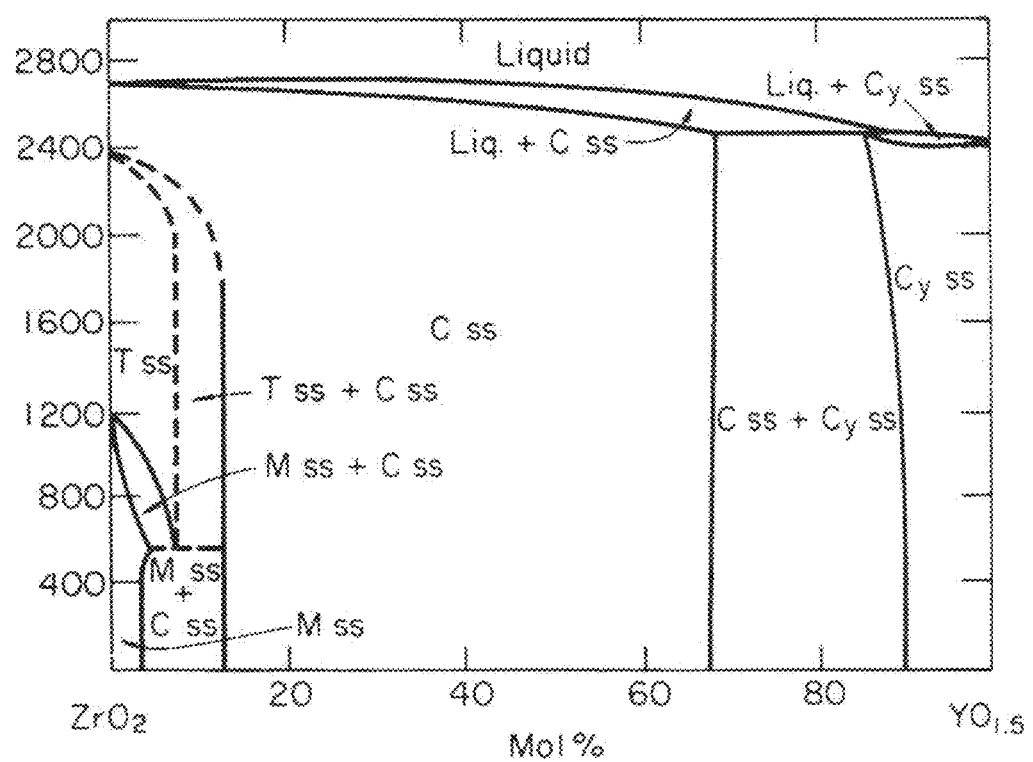

The Zr-rich CaZrO3 (CaZr1+yO3+2y) material of the present invention identified here as a novel high temperature ceramic catalyst carrier for use in harsh (acidic) environments such as decomposition of ionic propellants has a significant advantage over other stabilized zirconias, such as yttria (Y2O3)-stabilized zirconia or ceria(CeO2)-stabilized zirconia. Phase diagrams for all three systems, CaO—ZrO2, Y2O3-ZrO2, and CeO2-ZrO2, are shown in FIGS. 3A, 3B, and 3C. Of the three systems, the CaO—ZrO2 system is the only one containing a line compound, CaZrO3 (calcium zirconate). The other two systems contain no line compounds, only solid solutions. Line compounds, such as CaZrO3, are more stable than solid solutions and do not suffer from ageing, i.e., precipitation of a component oxide under a set of conditions. Therefore, over time, or during extended periods of use in HAN-based ionic salt monopropellant thrusters, CaZrO3 will not decompose, undergo a phase change, or otherwise destabilize. On the other hand, stabilizers in Y2O3-stabilized ZrO2 and CeO2-stabilized ZrO2 will precipitate out of the zirconia grains, react with acidic environments, and destabilize ZrO2, causing mechanical degradation of these carriers after extended periods of use at high temperatures.

Furthermore, the oxygen diffusion rate in CaZrO3 is 5 times lower than that in stabilized cubic zirconia. This makes CaZrO3 not only more sintering resistant but also more thermochemically stable in oxygen-rich and/or steam-rich atmospheres at elevated temperatures than stabilized cubic zirconia. As discussed above, since the presence of any stabilized cubic zirconia in the Zr-rich CaZrO3 (CaZr1+yO3+2y) material described herein would be in the form of small, discrete particles, the thermal characteristics of the CaZrO3 are unchanged.

The CaZr1+yO3+2δ ceramic of the present invention with small amounts of excess Zr ions in the form of stabilized cubic zirconia described herein is believed to be the best suited carrier for catalysts for high-energy-density ionic salt monopropellants (including HAN-based monopropellants) developed to-date due to the following properties of the material: (i) a high melting point (2507° C.) and low oxygen diffusion; (ii) the absence of destructive phase transformations in CaZrO3, making it highly resistant to sintering and thermal shock at temperatures up to and beyond >1800° C.; (iii) the reduction or elimination of CaO at the CaZrO3 grain boundaries by the addition of excess Zr ions in the form of ZrO2, making the material highly resistant to chemical (acid) attack; and (iv) the presence of stabilized cubic zirconia as small, isolated particles at the CaZrO3 grain boundaries, thereby preventing formation of large cubic zirconia grains that are more susceptible to thermal aging.

The characteristics of the Zr-rich CaZrO3 (CaZr1+yO3+2y) of the present invention discussed above that make it a suitable carrier for catalysts for high-energy-density ionic salt monopropellants are also applicable to the Hf-rich CaHfO3 (CaHf1+yO3+2y) of the present invention, since CaHfO3 is isostructural with CaZrO3 and has similar chemical properties. One or more of the characteristics of the present invention discussed above that make CaZr1+yO3+2y a suitable carrier for catalysts for high-energy-density ionic salt monopropellants may also be applied to MgZr1+yO3+2y MgHf1+yO3+2y, SrZr1+yO3+2y, SrHf1+yO3+2y, BaZr1+yO3+2y, and BaHf1+yO3+2y.

If desired, a high surface area wash-coat can be applied to the ceramic catalyst carriers of the present invention to increase their surface areas. Suitable wash coats include, for example, (a) an alkaline-earth perovskite having the formula ABO3, wherein A is calcium, strontium, barium or magnesium or combinations thereof and B is zirconium or hafnium or combinations thereof, in which secondary phases having the formula AO present in the perovskite have been reduced, eliminated or are otherwise not present, (b) a non-stoichiometric zirconate or hafnate containing excess zirconium or hafnium cations and having the formula AB1+yO3+2y or AB1+yO3+2y, wherein y is about 0.005 to about 3.0, preferably about 0.005 to about 0.5, (c) HfO2, (d) ZrO2, (e) partially stabilized zirconia or hafnia containing calcia (CaO), magnesia (MgO), strontia (SrO), baria (BaO), yttria (Y2O3), ceria (CeO2) or other rare earth oxides as stabilizers and (f) fully stabilized zirconia or hafnia containing calcia (CaO), magnesia (MgO), strontia (SrO), baria (BaO), yttria (Y2O3), ceria (CeO2) or other rare earth oxides as stabilizers. The surface areas of the ceramic catalyst carriers of the present invention in general range from about 0.05 m2/g to about 50 m2/g.

In further embodiments, the present invention provides catalysts comprising the ceramic catalyst carrier as described above and an active metal coating which comprises about 0.1% to about 50% by weight, preferably about 1% to about 20% by weight, of one or more metals selected from the group consisting of platinum, rhodium, ruthenium, osmium, rhenium, and iridium.

In certain particular embodiments, the active metal coating of the catalyst comprises iridium or iridium/rhodium, iridium/osmium or iridium/osmium/rhodium alloys.

In other embodiments, the present invention provides catalysts comprising the ceramic catalyst carrier as described above and a catalytically active ceramic material.

In a particular embodiment, the catalytically active ceramic material is a non-stoichiometric perovskite ceramic.

Various methods can be used to apply catalytically active materials to the surface of the ceramic catalyst carriers of the present invention. For example, with respect to active metal coatings, wet deposition processes such as incipient wetness techniques, wet soaking techniques, ion exchange techniques and wet spraying techniques using salt solutions of the metal can be used. Other useful techniques for the application of active metal coatings include, for example, chemical vapor deposition and physical vapor deposition techniques such as sputtering.

One exemplary method for the deposition of iridium on the ceramic catalyst carriers of the present invention involves wet deposition of an iridium chloride salt solution followed by heat-treatment at about 300° C. to about 400° C. in air to stabilize the iridium chloride salt, and reduction in flowing hydrogen (H2) or a gaseous mixture containing H2 at temperatures in the range of about 400° C. to about 1000° C., to form Ir particles. It is desirable that the reduction temperature be about 500° C. to about 600° C.

Various methods can be used to prepare the ceramic catalyst carriers and catalysts of the present invention in which secondary phases with low acid resistance have been reduced, eliminated or are otherwise not present. For example, with respect to CaZO3 and CaHfO3, ceramic catalyst carriers can be fabricated from scratch from their precursor oxide or carbonate powders (e.g., CaCO3 and ZrO2 in the case of CaZrO3; CaCO3 and HfO2 in the case of CaHfO3) via processing method such as reactive sintering or sol-gel to precisely control their compositions. Commercially available CaZrO3 and CaHfO3 powders contain significant amounts of impurities and therefore do not have sufficient thermal or chemical stability for catalyst carrier development for high-energy-density ionic salt monopropellants (including HAN-based monopropellants) applications. In addition, Zr-rich CaZrO3 or Hf-rich CaHfO3 powders of necessary stoichiometries for the present invention are not commercially available. However, one can take the commercially available CaZrO3 and CaHfO3 powders and control their stoichiometries by fine ZrO2 (in the case of CaZrO3) and HfO2 (in the case of CaHfO3) powder addition before or during sintering or by evaporation before and after sintering. Fabrication of CaZrO3 and CaHfO3 ceramic carriers via a ceramic processing method allows for fine-tuning of the carrier composition, i.e., control of the exact stoichiometry, which is required to obtain a ceramic with high stability for use with HAN-based ionic salt monopropellants as described herein.

The present invention also provides methods of fabricating spherical ceramic catalyst carrier granules. In one embodiment, the present invention provides methods of fabricating spherical ceramic catalyst carrier granules comprising the steps of: suspending precursor powders in a liquid to form a slurry; flash-freezing droplets of the slurry to produce frozen spherical granules; sublimating the liquid from the frozen spherical granules to produce spherical precursor granules; and sintering the spherical precursor granules to produce the spherical ceramic catalyst carrier granules. In certain particular embodiments, the present invention provides methods for producing spherical ceramic carrier granules with diameters in the range of, but not limited to, about 0.30 mm to about 2.00 mm with controlled porosities and compositions.

Figure 4:
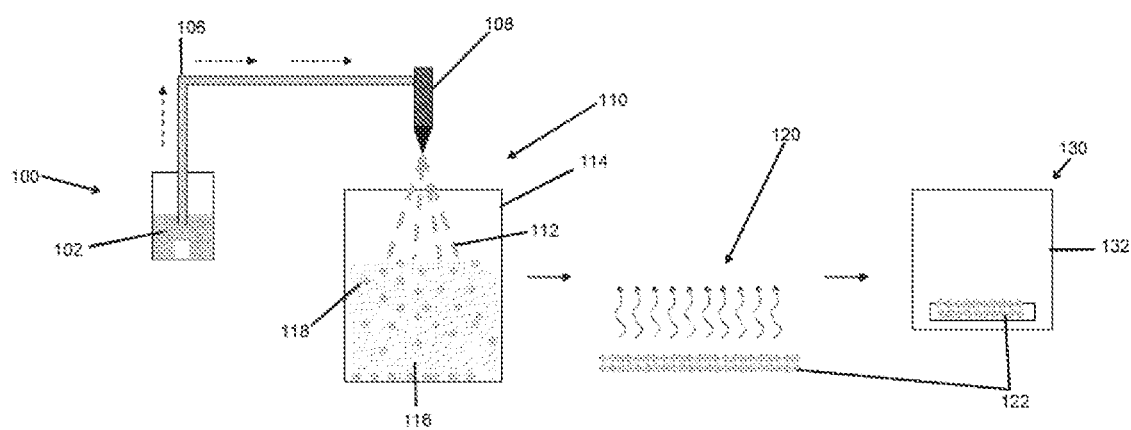
FIG. 4 is a schematic flow chart of a method of fabricating spherical ceramic catalyst carrier granules, in accordance with an embodiment of the present invention.

A flow chart with schematic drawings outlining an exemplary method for producing spherical ceramic catalyst carrier granules is given in FIG. 4. Referring now to FIG. 4, block 100 represents formation of a slurry 102 by dispersing precursor powders in an appropriate liquid. Depending on the particular ceramic material to be produced, different precursor powders are used as starting materials. For example, in the case of the Zr-rich CaZrO3 (CaZr1+yO3+2y) ceramic catalyst carriers of the present invention, CaCO3 and ZrO2 can be used. Similarly, in the case of the Hf-rich CaHfO3 (CaHf1+yO3+2y) ceramic catalyst carriers of the present invention, CaCO3 and HfO2 can be used. The choice of liquid will also depend on the particular ceramic material to be produced. Suitable liquids include, for example, aqueous solutions such as water, water-ethanol mixtures or other water-alcohol mixtures and non-aqueous solvents such as cyclohexane and tert-amyl alcohol and mixtures thereof. A suitable dispersant or dispersants (if needed) can be added to the liquid to assist in the formation of the slurry 102 at concentrations of about 0.5% to about 5% by weight to the powder. Suitable dispersants include, for example, polyacrylic acid, its ammonium salts, or mixtures thereof. The concentration of the precursor powders in the slurry 102 so produced ranges from about 5% to about 50% by volume solids loading, preferably about 10% to about 25%. Approximately 1%-5% by weight of a suitable binder is added to the slurry 102 if needed to impart mechanical strength to the resulting precursor ("green") ceramic granules before the final reactive sintering step. Suitable binders include, for example polyvinyl alcohol.

Block 110 of FIG. 4 represents flash freezing of droplets 112 of the slurry 102 in a cold bath 114. In the illustrated embodiment, this is accomplished by transferring the slurry 102 from a container 104 holding the slurry 102 via a slurry feed line 106 to a spray nozzle 108 and spraying the slurry 102 containing the ceramic precursor powders in the form of a single stream or multiple streams of isolated droplets into the cold bath 114 containing a liquid 116 held at temperatures sufficiently below the freezing point of the slurry to promote flash freezing (e.g., below about −50° C., and preferably in the range of −60° C. to −65° C.), that flash-freezes the droplets 112 on contact to form frozen spherical slurry granules 118. Suitable liquids 116 for use in the cold bath 114 include hydrocarbons, for example, pentane, hexane, or petroleum derivatives such as kerosene, or liquid nitrogen. Various parameters such as the pressure, slurry flow rate, nozzle distance from the liquid 116, angle of the nozzle relative to the liquid 116, temperature of the liquid 116, solids loading of the slurry 102 and slurry viscosity are carefully controlled to produce crack-free spherical granules upon freezing. The frozen spherical granules 118 are subsequently removed from the cold bath 114 and placed in a freezer to maintain their physical properties (shapes and porosities) before further processing.

Block 120 represents removal of the liquid from the flash frozen spherical granules 118 by sublimation following their recovery from the cold bath 114. The liquid from the flash frozen granules 118 is removed via sublimation to prevent collapse of pores and maintain the microstructure of precursor ("green") ceramic granules 122 resulting from the sublimation process. The sublimation conditions are selected based on the particular ceramic material to be produced and the solvent to be removed. Typically, when using water-based slurries for granule production, sublimation is performed by heating the ceramic granules from about −50° C. to room temperature, typically 20° C.-30° C., while keeping the pressure below about 200 mtorr.

Block 130 represents heat-treatment of the green precursor ceramic granules 122 following removal of the solvent by sublimation to remove binder and facilitate formation of the desired ceramic material. In the illustrated embodiment, the green precursor ceramic granules are placed in a furnace 132 to perform the heat-treatment. In an exemplary embodiment of this process step, the green precursor ceramic granules 122 are heat-treated at temperatures in the range of about 200° C. to about 550° C. to remove the binder, other organic additives or both and then immediately heat-treated at temperatures above about 1000° C. and preferably up to about 1900° C. (and more preferably in the range of 1450° C. to 1900° C.) to facilitate reactive sintering and formation of the desired ceramic material, for example Zr-rich CaZO3 (CaZr1+yO3+2y) or Hf-rich CaHfO3 (CaHf1+yO3+2y).

The ceramic processing technique described herein can be used to produce ceramic granules of any composition by use of appropriate precursor powders in the aqueous slurry. In addition, solvents other than water may be used as long as (i) the precursor (e.g., oxide) powders can be dispersed within the solvent, (ii) there is a suitable medium, or organic liquid, that can be used as a bath for the flash-freezing process to form spherical granules and (iii) the solvent can be removed by freeze-drying or any other sublimation technique to preserve the microstructure, namely the porosity and surface area, of the green precursor ceramic granules.

The ceramic processing technique described herein can be used to produce spherical ceramic granules of a very wide size (diameter) range by controlling the slurry properties and spray parameters.

The ceramic processing technique described herein can be used to produce spherical ceramic granules with diameters in the range of about 0.125 mm to about 12.7 mm or larger, preferably about 0.30 mm to about 2.00 mm, for use as catalyst substrates for propulsion applications.

Various organic, polymer, and/or acrylic materials can optionally be added to the slurry containing the ceramic precursor powders to provide porosity to the resulting granules after heat-treatment(s). For example, polypropylene beads size 300 mesh at 10% volume can be added to slurries, which are then removed during heat-treatment at approximately 500° C.-600° C. to provide porous green granules.

The ceramic processing techniques described herein can be used to produce spherical ceramic carrier granules, and thus spherical catalysts, that provide reproducible packing configurations and reproducible packing densities in thruster chambers. Reproducible packing of catalyst granules in thruster chambers helps to provide repeatable performances of said catalysts with high-energy-density ionic salt monopropellants, including HAN-based monopropellants. Since oblong or sharp-edged particles fracture more easily than spherical particles under pressure, the spherical shaped catalyst described here provides smoother thruster operation, with less pressure spikes, than non-spherical shaped catalysts.

Figure 5:
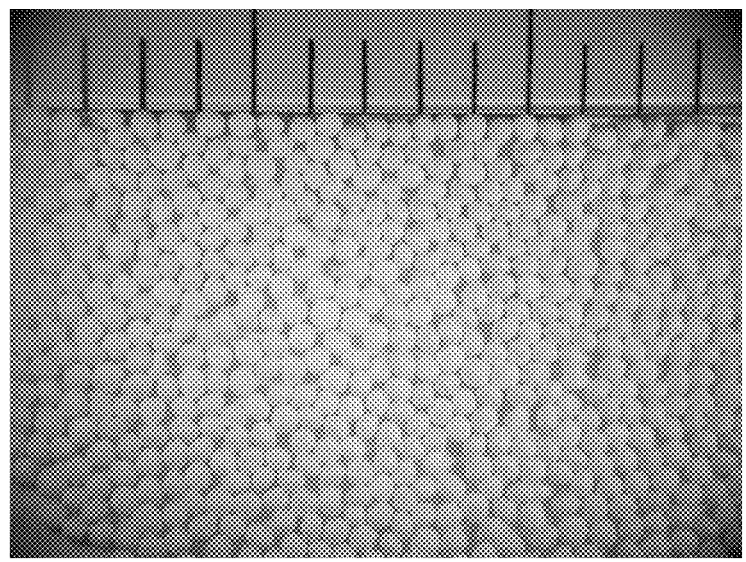
FIG. 5 is a photographic image of spherical $CaZr_{1+y}O_{3+2\delta}$ granules, in accordance with an embodiment of the present invention.
Figure 6:
FIG. 6 is a photographic image of spherical iridium (Ir) coated $CaZr_{1+y}O_{3+2\delta}$ catalyst granules, in accordance with an embodiment of the present invention.

Photographic images of spherical alumina (Al2O3) and CaZr1+yO3+2δ ceramic carrier granules produced via the flash-freezing/freeze drying process described hereinabove are shown in FIGS. 5 and 6, respectively.

The following examples illustrate certain embodiments of the invention and are not to be construed as limiting the present disclosure.

EXAMPLES

Example 1: Production of CaZr1+yO3+2Y Granules where y=0.1, Using Flash-Freeze Process and Reactive Sintering Necessary amounts of CaCO3 and ZrO2 powders to give a mole ratio of Ca/Zr=1.1 and total solids loading of 16% vol were dispersed in water by ball-milling using an ammonium polyacrylate type dispersant. After milling is complete, a water-soluble binder such as polyvinyl alcohol was added to the slurry at a concentration of 3.0% by weight to the powder (solids). The milled slurry was dispensed into a cold hexane bath held at a temperature of −60° C. using a spray atomizer and feed pressure of 2 psi while keeping the spray nozzle at least 2 cm above the height of the hexane. The flash-frozen granules were then removed from the hexane and placed in a freeze-dryer sample chamber held at a temperature of −20° C. to insure the granules did not melt. The pressure inside the freeze-dryer chamber was reduced to <150 mtorr vacuum while maintaining the given temperature, then the temperature was slowly increased to room temperature while under vacuum causing the water in the granules to sublime. The resulting precursor ("green") granules were removed from the freeze-dryer and placed in a muffle furnace for binder removal. The binder was removed from the green granules by heating to 200° C. to 550° C. (and preferably in the range of 450° C. to 550° C.) in flowing air. The granules are immediately transferred to an open tube furnace and heat-treated at temperatures >1400° C. to facilitate reactive sintering and formation of ceramic granules with the exact stoichiometry of CaZr1.1O3.2.

Example 2: Coating of CaZr1.1O3.2 Granules with Iridium (Ir)

The CaZr1.1O3.2 granules produced in accordance with Example 1 herein above were coated with iridium (Ir) via wet deposition using a dihydrogen hexachloroiridic acid solution to give a loading of 5%-10% by weight Ir. The Ir—CaZr1.1O3.2 catalyst was subject to engine fire tests with a HAN-based ionic salt propellant and ignited 10 lbm of propellant in random sequences of 0.1 sec-20 sec duration pulses and survived >1,000 pulses with an accumulative fire time of >7 minutes (Zuttarelli, A., Gabrang, G., Gumulak, P., Moore, J., Zankich, V., Sawhill, S., "AFRL Advanced Monopropellant Risk Reduction (AMRR) Effort for Ionic Liquids," 57th JANNAF Propulsion Conference, Colorado Springs, Colo., May 2010).

Example 3: Production of CaZr1+yO3+2Y Granules where y=0.85, Using Flash-Freeze Process and Reactive Sintering and Coating of Said Granules with Iridium (Ir)

CaZr1.85O4.7 granules were produced using the procedure set forth in Example 1 above except that the slurry contained necessary amounts of CaCO3 and ZrO2 powders to give a mole ratio of Ca/Zr=1.1.85. No other significant changes were made to the said procedure. The CaZr1.85O3.2 granules were coated with iridium (Ir) via wet deposition using the same procedure described in Example 2 above. The Ir—CaZr1.85O4.7 catalyst was subject to engine fire tests with a HAN-based ionic salt propellant and demonstrated an accumulative fire time of >30 minutes.

While various embodiments of the invention have been illustrated and described, as noted above, many changes can be made without departing from the spirit and scope of the invention. Also, some method steps may be performed in a different order than that described or concurrently with other steps. Accordingly, the scope of the invention is not limited by the disclosure of the particular embodiments disclosed herein. Instead, the invention should be determined entirely by reference to the claims that follow. All publications and patents mentioned herein are incorporated herein by reference in their entirety.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method of fabricating spherical ceramic catalyst carrier granules comprising the steps of:
suspending precursor powders in a liquid to form a slurry;
flash-freezing droplets of the slurry to produce frozen spherical granules, the flash-freezing being performed by dispensing the slurry in one or multiple streams into a bath that comprises a liquid material cooled to a temperature sufficiently below the freezing point of the slurry to promote flash-freezing;
sublimating the liquid from the frozen spherical granules to produce spherical precursor granules; and
sintering the spherical precursor granules to produce the spherical ceramic catalyst carrier granules;
wherein step of dispensing is performed using a spray nozzle and dispensing of the slurry is controlled using one or more parameters selected from the group consisting of slurry flow rate, spraying pressure, distance of the nozzle to the liquid, nozzle opening diameter, solids loading of the slurry, viscosity of the slurry, and temperature of the cold bath, to produce spherical, crack-free granules.

2. The method of claim 1, wherein the liquid is water.

3. The method of claim 1, wherein the slurry further comprises about 0.5% to about 5% by weight of a dispersant.

4. The method of claim 1 further comprising adding a binder that is soluble in the liquid to the slurry before flash-freezing of the slurry.

5. The method of claim 1 further comprising adding organic additives, beads or both organic additives and beads to the slurry and, after flash-freezing and sublimation of the slurry, subsequently removing the organic additives, beads or both by heat-treatment to provide porosity to the spherical ceramic catalyst carrier granules.

6. The method of claim 1, wherein the spray nozzle is a two-fluid spray nozzle.

7. The method of claim 1, wherein the liquid material is hexane and the temperature is below about −50° C.

8. The method of claim 1, wherein the liquid material is hexane and the temperature is in the range of −60° C. to −65° C.

9. The method of claim 1 further comprising heat-treating the spherical precursor granules in an air atmosphere at a temperature of about 200° C. to about 550° C. to remove a binder or other organic additives or both.

10. The method of claim 1 further comprising heat-treating the spherical precursor granules in an air atmosphere at a temperature of about 450° C. to about 550° C.

11. The method of claim 1, wherein the sintering of the spherical precursor granules is performed at temperatures in the range of about 1000° C. to about 1900° C. to promote reactive sintering or impart mechanical strength or both.

12. The method of claim 1, wherein the sintering of the spherical precursor granules is performed at temperatures in the range of about 1450° C. to about 1800° C.

13. The method of claim 1, wherein the slurry is dispensed using a spray nozzle and dispensing of the slurry is controlled by controlling slurry flow pressure.

14. The method of claim 1, wherein the slurry is dispensed using a spray nozzle and dispensing of the slurry is controlled by adjusting a settable distance of the nozzle to the liquid.

15. The method of claim 1, further comprising applying an active metal coating to the surface of the spherical ceramic catalyst carrier granules.

16. The method of claim 15, wherein the active metal coating comprises about 0.1% to about 50% by weight of one or more metals selected from the group consisting of platinum, rhodium, ruthenium, rhenium, osmium, and iridium.

17. The method of claim 15, wherein the active metal coating comprises iridium.

18. The method of claim 17, wherein the step of applying the active metal coating further comprises:
wet deposition of an iridium chloride salt solution;
heat-treatment at about 300° C. to about 400° C. in air to stabilize the iridium chloride salt; and
reduction in flowing hydrogen (H2) or a gaseous mixture containing H2 at temperatures in the range of about 400° C. to about 1000° C.

* * * * *